(12) United States Patent
Siohan et al.

(10) Patent No.: US 9,263,033 B2
(45) Date of Patent: Feb. 16, 2016

(54) UTTERANCE SELECTION FOR AUTOMATED SPEECH RECOGNIZER TRAINING

(71) Applicant: Google Inc., Mountain View, CA (US)

(72) Inventors: Olivier Siohan, Glen Rock, NJ (US); Pedro J. Mengibar, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 85 days.

(21) Appl. No.: 14/314,295

(22) Filed: Jun. 25, 2014

(65) Prior Publication Data

US 2015/0379983 A1    Dec. 31, 2015

(51) Int. Cl.
*G10L 15/00* (2013.01)
*G10L 15/06* (2013.01)

(52) U.S. Cl.
CPC ....... *G10L 15/063* (2013.01); *G10L 2015/0635* (2013.01)

(58) Field of Classification Search
CPC ... G10L 15/063; G10L 15/22; G10L 15/1815; G10L 15/18; G10L 15/06; G10L 15/183; G10L 17/04; G10L 2015/0635
USPC .................. 704/232, 236, 239, 243, 244, 247
See application file for complete search history.

(56) References Cited

U.S. PATENT DOCUMENTS

| | | | | |
|---|---|---|---|---|
| 2009/0171660 A1* | 7/2009 | Jian | .......................... | G10L 17/24 704/246 |
| 2012/0271631 A1* | 10/2012 | Weng | .................... | G10L 15/063 704/243 |

OTHER PUBLICATIONS

Dean, Jeffrey et al., "Large Scale Distributed Deep Networks," Neural Information Processing Systems 25, 2012, 11 pages.
Huang, Yan et al., "Semi-Supervised GMM and DNN Acoustic Model Training with Multi-System Combination and Confidence Re-Calibration," INTERSPEECH 2013, 5 pages.
Jiang, Hui, "Confidence Measure for Speech Recognition: A Survey," Technical Report CS-2003-06, Department of Computer Science, York University, May 30, 2003, 28 pages.
Kenny, Patrick et al., "Eigenvoice Modeling with Sparse Training Data," IEEE Transactions on Speech and Audio Processing, vol. 13, No. 3, May 2005, 10 ages.
Kullback, S. et al., "On Information and Sufficiency," The annals of Mathematical Statistics vol. 22, No. 1, Mar. 1951, 9 pages.
Lee, Lillian, "Measures of Distributional Similarity," arXiv:cs.CL/0001012, Jan. 18, 2000, 9 pages.

(Continued)

*Primary Examiner* — Thierry L Pham
(74) *Attorney, Agent, or Firm* — Fish & Richardson P.C.

(57) ABSTRACT

Methods, systems, and apparatus, including computer programs encoded on a computer storage medium, for generating a set of training utterances. The methods, systems, and apparatus include actions of obtaining a target multi-dimensional distribution of characteristics in an initial set of candidate utterances and selecting a subset of the initial set of candidate utterances based on speech recognition confidence scores associated with the candidate utterances. Additional actions include selecting a particular candidate utterance from the subset of the initial set of utterances and determining that adding the particular candidate utterance to a set of training utterances reduces a divergence of a multi-dimensional distribution of the characteristics in the set of training utterances from the target multi-dimensional distribution. Further actions include adding the particular candidate utterance to the set of training utterances.

20 Claims, 3 Drawing Sheets

(56) References Cited

OTHER PUBLICATIONS

Povey, Daniel et al., "Boosted MMI for Model and Feature-Space Discriminative Training," IEEE International Conference on Acoustics, Speech and Signal Processing, 2008 (ICASSP 2008), 4 pages.
Sethy, Abhinav et al., "An Iterative Relative Entropy Minimization-Based Data Selection Approach for n-Gram Model Adaptation," IEEE Transactions on Audio, Speech, and Language Processing, vol. 17, No. 1, Jan. 2009, 11 pages.
Siohan, Olivier et al., "iVector-based Acoustic Data Selection," INTERSPEECH 2013, 5 pages.
Zeiler, M.D. et al., "On Rectified Linear Units for Speech Processing," ICASSP, IEEE, 2013, 5 pages.
Zhang, Rong et al., "A New Data Selection Approach for Semi-Supervised Acoustic Modeling," Carnegie Mellon University Research Showcase @ CMU, Computer Science Department, 2006, 5 pages.

* cited by examiner

UTTERANCE SELECTION FOR AUTOMATED SPEECH RECOGNIZER TRAINING

TECHNICAL FIELD

This disclosure generally relates to the training of automated speech recognizers.

BACKGROUND

An automated speech recognizer may be trained using training data that includes audio recordings of utterances and corresponding transcripts of the utterances. For example, training data may include an audio recording of "AUTOMATION" and a corresponding transcription of "AUTOMATION." The quality of recognition by a trained automated speech recognizer may depend on the quality of the training data used to train the automated speech recognizer. For example, an automated speech recognizer that is trained using training data with incorrect transcriptions or biases may produce similarly incorrect transcriptions or biased transcriptions.

SUMMARY

To maintain quality of training data for training an automated speech recognizer, a system may select utterances for training data based on a multi-dimensional distribution of characteristics in the training data. For example, the characteristics may include a signal to noise ratio, sub-words, a gender of speaker, an age of speaker, a location of speaker, an accent of speaker, or an application that the utterance originated from. The system may obtain an initial set of candidate utterances and determine a multi-dimensional distribution of characteristics in the initial candidate utterances. The system may then filter the initial candidate utterances by speech recognition confidence score and select the remaining candidate utterances that, when included in a set of training utterances, reduce a divergence of a multi-dimensional distribution of the characteristics in the set of training utterances from the multi-dimensional distribution of the characteristics in the initial candidate utterances.

In some aspects, the subject matter described in this specification may be embodied in methods that may include the actions of obtaining a target multi-dimensional distribution of characteristics in an initial set of candidate utterances and selecting a subset of the initial set of candidate utterances based on speech recognition confidence scores associated with the candidate utterances. Additional actions include selecting a particular candidate utterance from the subset of the initial set of utterances and determining that adding the particular candidate utterance to a set of training utterances reduces a divergence of a multi-dimensional distribution of the characteristics in the set of training utterances from the target multi-dimensional distribution. Further actions include, adding the particular candidate utterance to the set of training utterances.

Other versions include corresponding systems, apparatus, and computer programs, configured to perform the actions of the methods, encoded on computer storage devices.

These and other versions may each optionally include one or more of the following features. For instance, in some implementations the characteristics include two or more of sub-words included in utterances, gender of speaker, accent of speaker, age of speaker, application that the utterance originates, or confidence score.

In some aspects, obtaining a target multi-dimensional distribution of characteristics in an initial set of candidate utterances includes obtaining the initial set of candidate utterances, calculating a distribution of sub-words in the initial set of candidate utterances based on transcriptions associated with the initial set of candidate utterances, calculating a distribution of another characteristic in the initial set of candidate utterances, and generating the target multi-dimensional distribution from the calculated distributions.

In certain aspects, selecting a subset of the initial set of candidate utterances based on speech recognition confidence scores associated with the candidate utterances includes filtering the initial set of candidate utterances based on the speech recognition confidence scores to obtain the subset of the initial set of candidate utterances.

In some implementations, determining that adding the particular candidate utterance to a set of training utterances reduces a divergence of a multi-dimensional distribution of the characteristics in the set of training utterances from the target multi-dimensional distribution includes obtaining a set of utterances consisting of candidate utterances that were previously added from the initial set of candidate utterances.

In some aspects, determining that adding the particular candidate utterance to a set of training utterances reduces a divergence of a multi-dimensional distribution of the characteristics in the set of training utterances from the target multi-dimensional distribution includes determining a first multi-dimensional distribution of characteristics in the set of training utterances without the candidate utterance, determining a second multi-dimensional distribution of characteristics in the set of training utterances with the candidate utterance, determining that the first multi-dimensional distribution is more divergent from the target multi-dimensional distribution than the second distribution, and in response to determining that the first multi-dimensional distribution is more divergent from the target multi-dimensional distribution than the second distribution, determining that adding the particular candidate utterance to the set of training utterances reduces the divergence of the multi-dimensional distribution of the characteristics in the set of training utterances from the target multi-dimensional distribution.

In certain aspects, actions include training an automated speech recognizer using the set of training utterances including the particular candidate utterance.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Automated speech recognizers can be trained in a supervised mode using manually labeled training data, e.g., a collection of audio recordings of utterances and corresponding transcripts. Unfortunately, manually transcribing a large amount of utterances to be used as training data may scale poorly as it may be an expensive and time consuming procedure. Alternatively, semi-supervised training may be used where instead of using manual transcription of utterances, an existing speech recognition system may be used to automatically generate the transcripts of the utterances. Semi-supervised training may be especially attractive as it may enable the construction of extremely large sets of training data that are orders of magnitude larger than supervised training data.

However, automatically generated transcripts may include incorrect transcriptions, and incorrect transcriptions in training data may be detrimental to the quality of speech recognition of a trained automated speech recognizer. For example, an incorrect transcription in training data may result in a trained automated speech recognizer that produces the incorrect transcription. In an effort to improve the quality of the training data, the correctness of the training data may be validated using speech recognition confidence scores that indicate confidences that the transcriptions are correct. The speech recognition confidence scores may be generated by the existing speech recognition system along with the transcriptions.

In generating the training data, utterances that are associated with confidence scores that indicate a lack of confidence may be discarded as they may likely to be incorrectly transcribed. However, just discarding these utterances may reduce the quality of the confidence filtered training data as diversity in the training data may be limited. For example, such a selection procedure may not guarantee that an entire acoustic and linguistic space will be evenly sampled.

In more particular examples, speech that was produced in a noisy environment may be harder to recognize because of background noise. Accordingly, utterances from noisy environments may have low confidence scores and be largely discarded. In another example, uncommon utterances may be less well modeled by the existing speech recognition system. Accordingly, uncommon utterances may have low confidence scores and be largely discarded. In yet another example, particular combinations of sub-words may correspond to different, similarly sounding words. Accordingly, utterances including the particular combinations of sub-words may be largely discarded. If this selection is repeated, these negative effects may accumulate and the recognizer may fail more and more on under-sampled conditions, e.g., conditions regarding noise, particular sub-words used, or types of speakers, and eventually the recognizer may be unusable.

Figure 1:
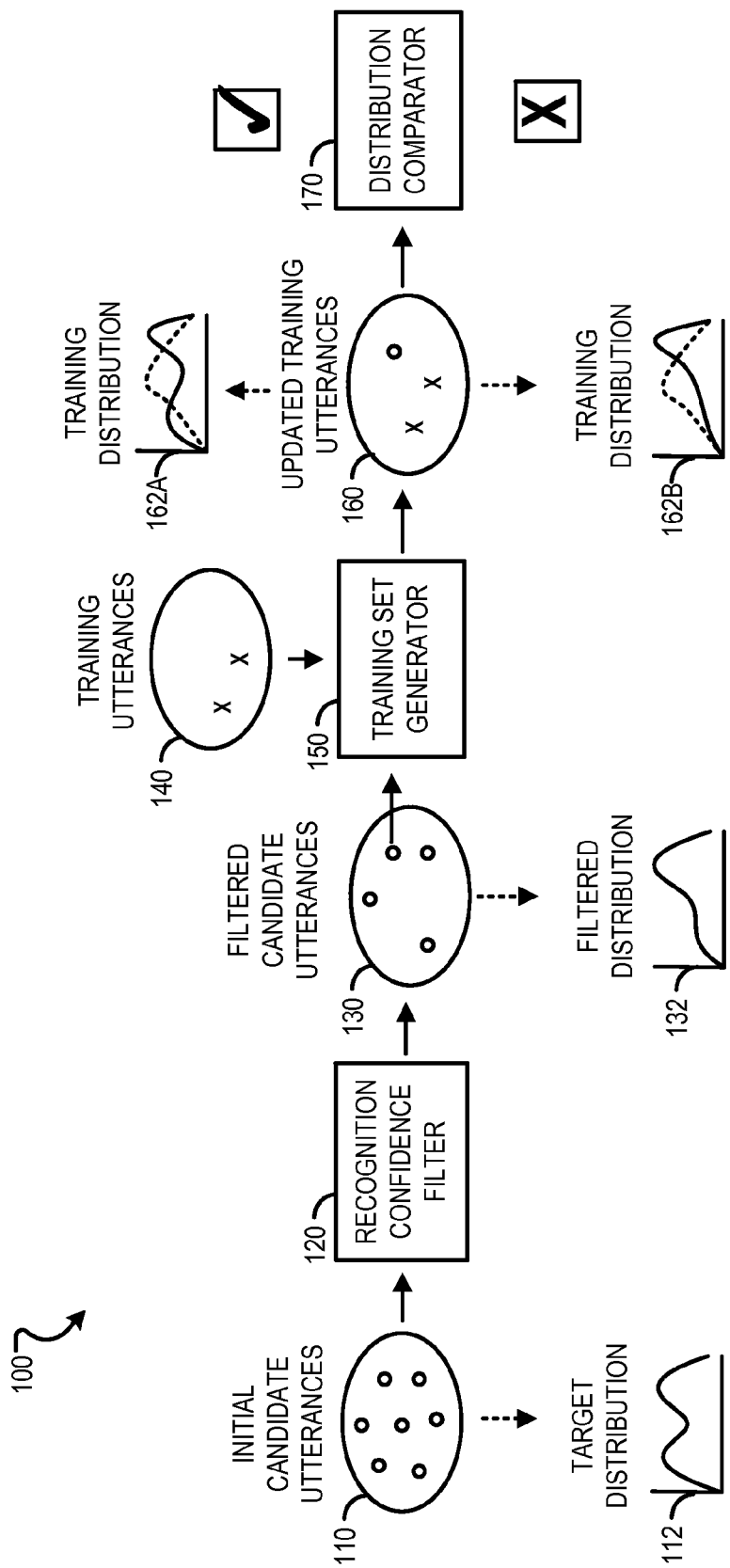
FIG. 1 is a block diagram of an example system for generating a set of training utterances.

FIG. 1 is a block diagram of an example system 100 for generating a set of training utterances. Generally, the system 100 includes a recognition confidence filter 120 that filters an initial set of candidate utterances 110, a training set generator 150 that updates a set of training utterances 140 using a set of filtered candidate utterances 130, and a distribution comparator 170 that compares a distribution 162A, B of a particular characteristic in the updated set of training utterances with a target distribution 112.

In more detail, the initial set of candidate utterances 110 may include utterances that are associated with both corresponding transcriptions of the utterances and speech recognition confidence scores indicating a confidence that the corresponding transcriptions are correct. For example, the initial set of candidate utterances may include a first audio recording of the utterance "ACCEPT" in association with a corresponding transcription of "ACCEPT" and a speech recognition confidence score of "0.6," indicating that the transcription is of medium confidence. Speech recognition scores may vary from "0" to "1," where "0" may indicate lowest confidence and "1" may indicate highest confidence. The initial set of candidate utterances may include a second audio recording of the utterance "NAVIGATE" in association with a corresponding transcription of "NAVIGATE" and a speech recognition confidence score of "0.9," indicating that the transcription is of high confidence. The initial set of candidate utterances may include a third audio recording of the utterance "PRINCIPLE" in association with a corresponding transcription of "PRINCIPAL" and a speech recognition confidence score of "0.3," indicating that the transcription is of low confidence.

The initial set of candidate utterances 110 may be associated with a target distribution 112 of a particular characteristic. For example, a distribution of sub-words in the initial set of candidate utterances 110 may be the target distribution 112. In some implementations, the sub-words may be triphones. For example, a sub-word may be "IN-SEE-POL." In some implementations, a distribution may be a histogram. For example, the target distribution 112 may indicate sequences of three phonemes and the number of times each sequence appears in the initial set of candidate utterances.

The recognition confidence filter 120 may obtain the initial set of candidate utterances 110 and generate a set of filtered candidate utterances 130. The recognition confidence filter 120 may generate the set of filtered candidate utterances 130 by selecting a subset of the initial set of candidate utterances 110. The recognition confidence filter 120 may select the subset of the initial set of candidate utterances 110 by filtering the initial set of candidate utterances 110 based on the speech recognition confidence scores. For example, the recognition confidence filter 120 may filter out candidate utterances that are associated with a speech recognition confidence score that does not satisfy a predetermined confidence score criteria, e.g., a confidence score greater than "0.35," "0.4," or "0.5."

In a particular example, the recognition confidence filter 120 may obtain the candidate utterance "PRINCIPLE" in association with a corresponding transcription of "PRINCIPAL" and a speech recognition confidence score of "0.3," determine that the confidence score does not satisfy a predetermined confidence score criteria of being greater than "0.4," and in response, filter out the candidate utterance. In another particular example, the recognition confidence filter 120 may obtain the candidate utterance "ACCEPT" in association with a corresponding transcription of "ACCEPT" and a speech recognition confidence score of "0.6," determine that the confidence score does satisfy the predetermined confidence score criteria, and in response select the candidate utterance to be included in the set of filtered candidate utterances 130.

The recognition confidence filter 120 may also determine the target distribution 112 for a particular characteristic. For example, the recognition confidence filter 120 may obtain the initial set of candidate utterances 110 and calculate a distribution of sub-words in the initial set of candidate utterances 110.

The set of filtered candidate utterances 130 generated by the recognition confidence filter 120 may be associated with a filtered distribution 132 for a particular characteristic. For example, the set of filtered candidate utterances 130 may be associated with its own distribution of sub-words. The filtered distribution 132 may diverge from the target distribution 112. For example, the set of filtered candidate utterance 130 may not include the candidate utterance "PRINCIPAL" that was included in the initial set of candidate utterances 110, so the filtered distribution 132 may diverge from the target distribution 112 in the frequency of sub-words in the candidate utterance "PRINCIPAL."

The training set generator 150 may obtain the filtered candidate utterances 130 and a set of training utterances 140 and generate an updated set of training utterances 160. In some implementations, the set of training utterances 140 may be initially empty. In other implementations, the set of training utterances 140 may initially include a base set of utterances and corresponding transcriptions. In some implementations, the set of training utterances 140 may include utterances that were previously selected from the set of filtered candidate utterances 130 by the training set generator 150.

The training set generator 150 may select a particular candidate utterance from the set of filtered candidate utterances 130 and add the selected particular candidate utterance to the set of training utterances 140. For example, the training set generator 150 may obtain the utterance "ACCEPT" and generate an updated set of training utterances 160 by adding the utterance "ACCEPT" to the set of training utterances 140.

The updated set of training utterances 160 may also be associated with a training distribution for a particular characteristic. For example, the updated set of training utterances 140 may be associated with a distribution shown by the solid graph in the training distribution 162A and 162B, where the distribution of the set of training utterances 140 without the added utterance is shown by the dotted graph in the training distributions 162A and 162B.

As shown in training distribution 162A, adding the updated set of training utterances 140 may result in a training distribution that has less divergence from the target distribution 112 than the distribution of the set of training utterances 140. As shown in training distribution 162B, alternatively, adding the updated set of training utterances 140 may result in a training distribution that has increased divergence from the target.

The distribution comparator 170 may obtain the updated set of training utterances 160 and the set of training utterances 140, and determine if adding the selected candidate utterance to the set of training utterances 140 reduces a divergence of the training distribution 162A, 162B of the updated set of training utterances 140 from a target distribution 112. As described above, the target distribution 112 may be calculated by the recognition confidence filter 120 based on the distribution of a particular characteristic in the initial set of candidate utterances 110. In other implementations, the distribution comparator 170 may obtain the target distribution 112 independently from the set of initial set of candidate utterances 110. For example, distribution comparator 170 may receive a target distribution 112 specified by a user.

The distribution comparator 170 may determine a first divergence of the training distribution 162A, 162B of the updated set of training utterances 160 from the target distribution 112, determine a second divergence of the training distribution 162A, 162B of the set of training utterances 140 from the target distribution 112, and determine whether the first divergence is less than the second divergence. For example, the distribution comparator 170 may calculate two corresponding Kullback-Leibler divergences.

If the first divergence is less than the second divergence, the system 100 may determine that adding the selected candidate utterance to the set of training utterances 140 reduces a divergence of the training distribution 162A, 162B of the updated set of training utterances 140 from a target distribution 112. In response, the system 100 may keep the updated set of training utterances 160 and the training set generator 150 may use the updated set of training utterances 160 as the set of training utterances 140.

If the first divergence is not less than the second divergence, the system 100 may determine that adding the selected candidate utterance to the set of training utterances 140 does not reduce a divergence of the training distribution 162A, 162B of the updated set of training utterances 140 from a target distribution 112. In response, the system 100 may discard the updated set of training utterances 160 and continue using the set of training utterances 140.

The training set generator 150 and distribution comparator 170 may continue iteratively selecting candidate utterances from the set of filtered candidate utterances 130 and comparing distributions until all candidate utterances in the set have been considered. The candidate utterances may be selected in descending alphabetical order by transcript, by descending confidence score, by decreasing number of sub-words, or some combination. The system 100 may then provide the final set of training utterances to an automated speech recognizer as training data for the automated speech recognizer.

In some implementations, the system 100 may consider multi-dimensional distributions of characteristics. For example, the system 100 may consider a two-dimensional distribution of sub-words and gender of speaker. The system 100 may similarly determine whether adding particular candidate utterances to the set of training utterances 140 reduces a divergence of a distribution for the first characteristic of the set of training utterances from a first dimension of a target distribution, but then further determine if adding the particular candidate utterances to the set of training utterances 140 reduces a divergence of a distribution for the second characteristic of the set of training utterances from a second dimension of the target distribution.

In some implementations, the system 100 may not add the particular candidate utterances unless they reduce divergences for both distributions of both characteristics, e.g., both dimensions of the multi-dimensional distribution. In some implementations, the system 100 may add the particular candidate utterances if they reduce the divergence for distributions for characteristics more than they increase the divergence for distributions for other characteristics. In some implementations, the system 100 may prioritize the characteristics. For example, the system 100 may still add a particular candidate utterance to the set of training utterances 140 if the divergence for a more prioritized characteristic is reduced as much as a divergence for a less prioritized characteristic is increased. In some implementations, the system 100 may add candidate utterances if they reduce a divergence of a multi-dimensional distribution of the characteristics in a set of training utterances from a target multi-dimensional distribution.

Divergence may quickly converge preventing the addition of further utterances to the set of training utterances 140. Accordingly, in some implementations, the system 100 may generate larger sets of training utterances 140 by splitting the set of filtered candidate utterances 130 into multiple sets of filtered candidate utterances 130 so that multiple sets of training utterances 140 are generated. The system 100 may then merge the multiple sets of training utterances 140 together into a single larger set of training utterances 140.

Different configurations of the system 100 may be used where functionality of the recognition confidence filter 120, training set generator 150, and distribution comparator 170 may be combined, further separated, distributed, or interchanged. The system 100 may be implemented in a single device or distributed across multiple devices.

Figure 2:
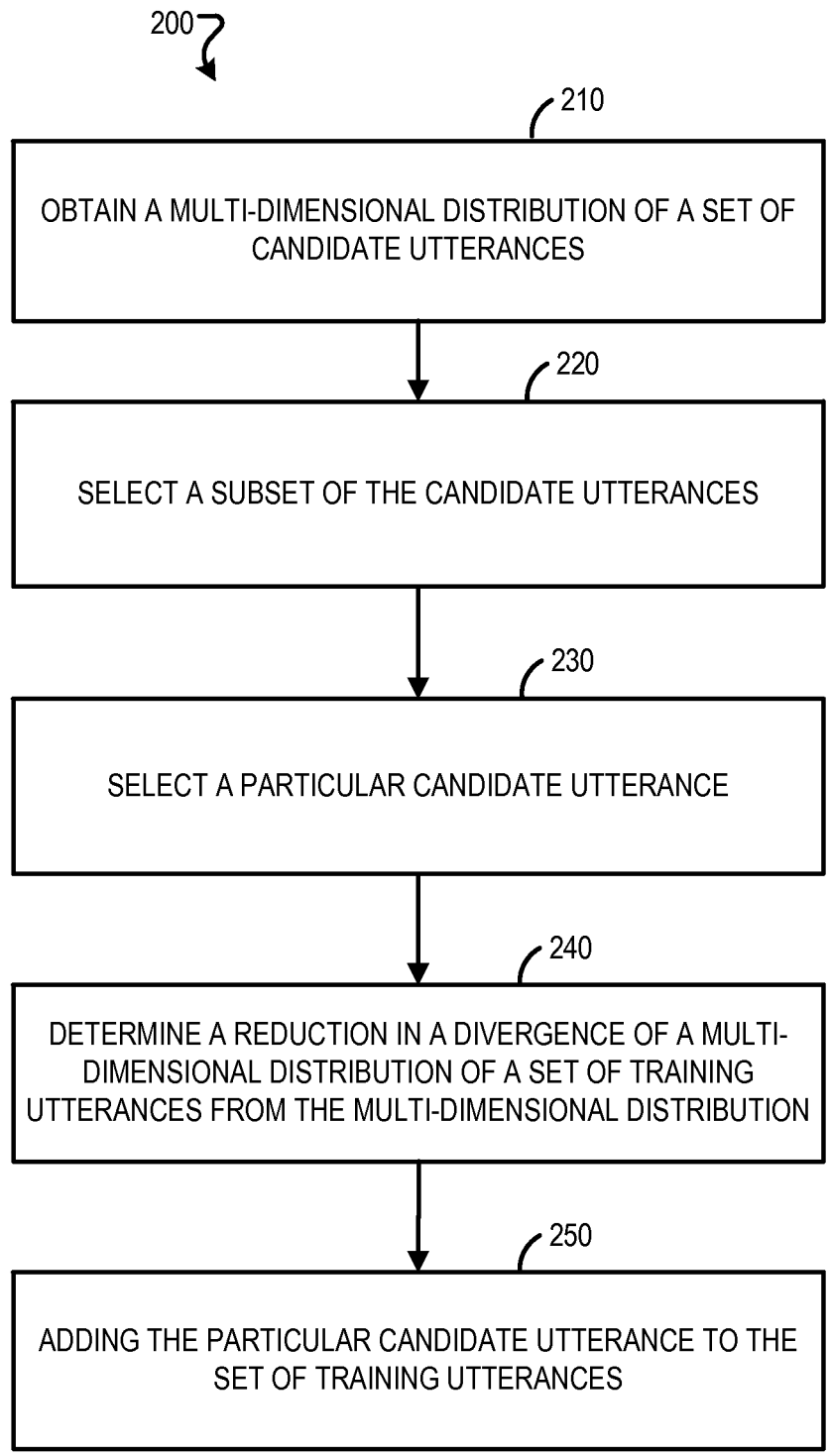
FIG. 2 is a flowchart of an example process for generating set of training utterances.

FIG. 2 is a flowchart of an example process 200 for generating a set of training data. The following describes the processing 200 as being performed by components of the system 100 that are described with reference to FIG. 1. However, the process 200 may be performed by other systems or system configurations.

The process 200 may include obtaining a multi-dimensional distribution of characteristics in an initial set of candidate utterances (210). For example, the recognition confidence filter 120 may obtain an initial set of candidate utterances 110 and calculate a multi-dimensional distribution of sub-words in the initial set of candidate utterances 110 and gender of speaker. In a particular example, the recognition confidence filter 120 may calculate a multi-dimensional distribution indicating a high frequency of a first tri-phone and a low frequency of a second tri-phone, and more female speakers than male speakers.

The characteristics may include a signal to noise ratio, sub-words, a gender of speaker, an age of speaker, a location of speaker, an accent of speaker, or an application that the utterance originated from. The characteristics for an utterance may be determined from the utterance or may be determined from information associated with the utterance. For example, the system 100 may determine the gender of a speaker for an utterance based on analyzing acoustic characteristics, e.g., pitch and tone, of the utterance or by obtaining metadata associated with the utterance that indicates that the speaker of the utterance is male, female, or unknown.

The process 200 may include selecting a subset of the initial set of candidate utterances based on speech recognition confidence scores associated with the candidate utterances (220). For example, the recognition confidence filter 120 may generate a set of filtered candidate utterances 130 by filtering out candidate utterances that are associated with a speech recognition confidence score indicating low confidence.

The process 200 may include selecting a particular candidate utterance from the subset of the initial set of utterances (230). For example, the training set generator 150 may select a candidate utterance "NAVIGATE" based on determining that the candidate utterance is the candidate utterance in the set of filtered candidate utterances 130 that is associated with the highest confidence score and that has not yet been selected.

The process 200 may include determining that adding the particular candidate utterance to a set of training utterances reduces a divergence of a multi-dimensional distribution of the characteristics in the set of training utterances from the multi-dimensional distribution of characteristics in the initial set of candidate utterances (240). For example, the distribution comparator 170 may determine that adding the candidate utterance "NAVIGATE" to the set of training utterances 140 changes the multi-dimensional distribution of the set of training utterances 140 so that the distribution better matches the target multi-dimensional distribution.

The process 200 may include adding the particular candidate utterance to the set of training utterances (250). For example, the system 100 may treat an updated set of training utterances 160 including the particular candidate utterance as the set of training utterances 140. Adding the particular candidate utterance may be in response to determining that adding the particular candidate utterance to the set of training utterances 140 reduces the divergence of the multi-dimensional distribution of the characteristics in the set of training utterances 140 from the multi-dimensional distribution of characteristics in the initial set of candidate utterances 110.

A detailed example follows. Let P(X) be the distribution of a random variable X characterizing utterances from the application domain and estimated from a development set. X may represent a random variable that can be obtained from an utterance. Let Q(X) be the distribution of the same variable X, but this time estimated from a data set selected from application logs. If the selected data is randomly sampled from the application logs, the distributions P(X) and Q(X) may be expected to be similar. In other words, the Kullback-Leibler divergence $D_{KL}(P||Q)$ between the 2 distributions may be expected to be close to 0.

However, the selection approach may not random but biased by a requirement that the selected utterances are expected to have a high confidence to favor utterances with a correct recognition hypothesis. This biased selection may result in a distribution Q(X) which may differ significantly from P(X), leading to a sub-optimal training set for the application.

A selection procedure may be used that iterates over a set of utterances from the logs and adds an utterance to the selected set only if it does not increase the KL divergence $D_{KL}(P||Q)$ between the reference distribution P and the distribution of the selected set Q. This may be formally described in the process shown in Table 1 below and may lead to the construction of a data set having a distribution Q close to P, based on the KL divergence.

TABLE 1

| | |
|---|---|
| Input: | A reference distribution P; an initial set of already selected utterances S; a large set of confidence-selected utterances U from the application logs |
| Output: | The selected data set S |
| 1 | Estimate the distribution $Q_S$ |
| 2 | $D \leftarrow D_{KL}(P||Q_S)$ |
| 3 | for each utterance u ∈ U do |
| 4 |     Estimate $Q_{S \cup u}$ |
| 5 |     $D' \leftarrow D_{KL}(P||Q_{S \cup u})$ |
| 6 |     if D' < D then |
| 7 |         $S \leftarrow S \cup u$ |
| 8 |         $D \leftarrow D'$ |
| 9 | return S |

The nature of the process may impose some practical constraints on the choice of those distributions. The first one is related to the derivation of $D_{KL}(P||Q_{SUu})$. Because it may have to be computed for each candidate utterance u, it may have to be computationally efficient. Similarly, the distribution $Q_{SUu}$ for each candidate utterance u may need to be efficiently re-estimated.

A data set may be characterized by the distribution of the context-dependent (CD) Hidden Markov Model (HMM) state symbols that may be obtained by aligning the utterance transcript (or hypothesized transcript) against the audio signal. The forced alignment may be done following standard procedure when training acoustic models. A word-level acceptor may be constructed from the transcript with optional silences added at the beginning/end of the utterance as well as between words. The transcript acceptor may be composed with a lexicon transducer, a context-dependency transducer, and an HMM transducer to produce a forced-alignment decoding graph. Running Viterbi decoding may then provide a sequence of context-dependent HMM state symbols along the alignment path. A set of utterances may be described by the unigram distribution of the CD state symbols collected by running forced-alignment. The data extracted from the logs may have been endpointed based on slightly different endpointer configurations since a Voice Search production engine may be regularly updated. For that reason, the CD state symbols corresponding to the silence phone may be discarded when estimating the distributions P and Q to prevent any skew related to variations in silence padding.

In the process shown in Table 1, the set of selected utterances S may be initialized by randomly selecting a small set of utterances from the logs. Given that ASR systems may operate on HMMs having an inventory of CD state symbols in the order of ten thousand states or more, the initial estimate of $Q_S$ may not be very accurate when S is small. To alleviate this issue, the skew divergence may be used, a smooth version of the KL divergence which interpolates $Q_S$ using P.

$$D_{SD}(P \parallel Q_S) = \sum_{c \in \{all\ CD\ states\}} P(c) \ln \frac{P(c)}{(1-\alpha)P(c) + \alpha Q_S(c)} \quad [\text{Eq. 1}]$$

In Equation 1, c represents a CD-state index and is a smoothing constant typically set in the range [0.95-1]. When the range is one, the skew divergence may be equivalent to the KL divergence.

Figure 3:
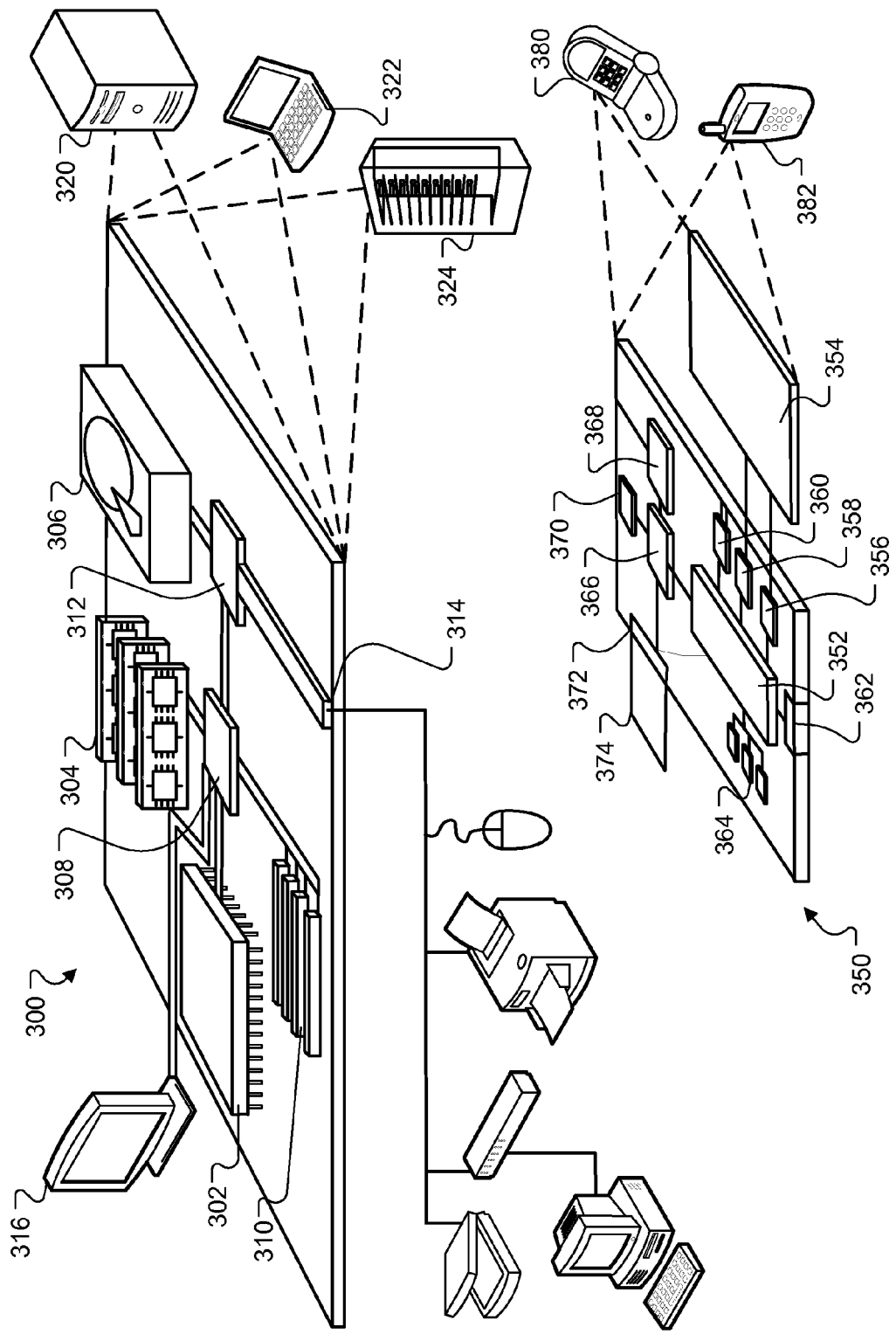
FIG. 3 is block diagram of an example of a computing device.

FIG. 3 shows an example of a computing device 300 and a mobile computing device 350 that can be used to implement the techniques described here. In some implementations, the system 100 for generating a set of training utterances may be implemented on the computing device 300, the mobile computing device 350, or a combination.

The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a graphical user interface (GUI) on an external input/output device, such as a display 316 coupled to the high-speed interface 308. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 302), perform one or more methods, such as those described above. The instructions can also be stored by one or more storage devices such as computer- or machine-readable mediums (for example, the memory 304, the storage device 306, or memory on the processor 302).

The high-speed interface 308 manages bandwidth-intensive operations for the computing device 300, while the low-speed interface 312 manages lower bandwidth-intensive operations. Such allocation of functions is an example only. In some implementations, the high-speed interface 308 is coupled to the memory 304, the display 316 (e.g., through a graphics processor or accelerator), and to the high-speed expansion ports 310, which may accept various expansion cards (not shown). In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device (not shown), such as a mobile computing device 350. Each of such devices may contain one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a microdrive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provided as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 352), perform one or more methods, such as those described above. The instructions can also be stored by one or more storage devices, such as one or more computer- or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry where necessary. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 368 using a radio-frequency. In addition, short-range communication may occur, such as using a Bluetooth, WiFi, or other such transceiver (not shown). In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, etc.) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 382, personal digital assistant, or other similar mobile device.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output.

The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:

1. A computer-implemented method comprising:
obtaining a target multi-dimensional distribution of characteristics in an initial set of candidate utterances;
selecting a subset of the initial set of candidate utterances based on speech recognition confidence scores associated with the candidate utterances;
selecting a particular candidate utterance from the subset of the initial set of utterances;
determining that adding the particular candidate utterance to a set of training utterances reduces a divergence of a multi-dimensional distribution of the characteristics in the set of training utterances from the target multi-dimensional distribution; and
adding the particular candidate utterance to the set of training utterances.

2. The method of claim 1, wherein the characteristics comprise two or more of: sub-words included in utterances, gender of speaker, accent of speaker, age of speaker, application that the utterance originates, or confidence score.

3. The method of claim 1, wherein obtaining a target multi-dimensional distribution of characteristics in an initial set of candidate utterances comprises:
obtaining the initial set of candidate utterances;

calculating a distribution of sub-words in the initial set of candidate utterances based on transcriptions associated with the initial set of candidate utterances;
calculating a distribution of another characteristic in the initial set of candidate utterances; and
generating the target multi-dimensional distribution from the calculated distributions.

4. The method of claim 1, wherein selecting a subset of the initial set of candidate utterances based on speech recognition confidence scores associated with the candidate utterances comprises:
filtering the initial set of candidate utterances based on the speech recognition confidence scores to obtain the subset of the initial set of candidate utterances.

5. The method of claim 1, wherein determining that adding the particular candidate utterance to a set of training utterances reduces a divergence of a multi-dimensional distribution of the characteristics in the set of training utterances from the target multi-dimensional distribution comprises:
obtaining a set of utterances consisting of candidate utterances that were previously added from the initial set of candidate utterances.

6. The method of claim 1, wherein determining that adding the particular candidate utterance to a set of training utterances reduces a divergence of a multi-dimensional distribution of the characteristics in the set of training utterances from the target multi-dimensional distribution comprises:
determining a first multi-dimensional distribution of characteristics in the set of training utterances without the candidate utterance;
determining a second multi-dimensional distribution of characteristics in the set of training utterances with the candidate utterance;
determining that the first multi-dimensional distribution is more divergent from the target multi-dimensional distribution than the second distribution; and
in response to determining that the first multi-dimensional distribution is more divergent from the target multi-dimensional distribution than the second distribution, determining that adding the particular candidate utterance to the set of training utterances reduces the divergence of the multi-dimensional distribution of the characteristics in the set of training utterances from the target multi-dimensional distribution.

7. The method of claim 1, comprising:
training an automated speech recognizer using the set of training utterances including the particular candidate utterance.

8. A system comprising:
one or more computers; and
one or more storage devices storing instructions that are operable, when executed by the one or more computers, to cause the one or more computers to perform operations comprising:
obtaining a target multi-dimensional distribution of characteristics in an initial set of candidate utterances;
selecting a subset of the initial set of candidate utterances based on speech recognition confidence scores associated with the candidate utterances;
selecting a particular candidate utterance from the subset of the initial set of utterances;
determining that adding the particular candidate utterance to a set of training utterances reduces a divergence of a multi-dimensional distribution of the characteristics in the set of training utterances from the target multi-dimensional distribution; and
adding the particular candidate utterance to the set of training utterances.

9. The system of claim 8, wherein the characteristics comprise two or more of:
sub-words included in utterances, gender of speaker, accent of speaker, age of speaker, application that the utterance originates, or confidence score.

10. The system of claim 8, wherein obtaining a target multi-dimensional distribution of characteristics in an initial set of candidate utterances comprises:
obtaining the initial set of candidate utterances;
calculating a distribution of sub-words in the initial set of candidate utterances based on transcriptions associated with the initial set of candidate utterances;
calculating a distribution of another characteristic in the initial set of candidate utterances; and
generating the target multi-dimensional distribution from the calculated distributions.

11. The system of claim 8, wherein selecting a subset of the initial set of candidate utterances based on speech recognition confidence scores associated with the candidate utterances comprises:
filtering the initial set of candidate utterances based on the speech recognition confidence scores to obtain the subset of the initial set of candidate utterances.

12. The system of claim 8, wherein determining that adding the particular candidate utterance to a set of training utterances reduces a divergence of a multi-dimensional distribution of the characteristics in the set of training utterances from the target multi-dimensional distribution comprises:
obtaining a set of utterances consisting of candidate utterances that were previously added from the initial set of candidate utterances.

13. The system of claim 8, wherein determining that adding the particular candidate utterance to a set of training utterances reduces a divergence of a multi-dimensional distribution of the characteristics in the set of training utterances from the target multi-dimensional distribution comprises:
determining a first multi-dimensional distribution of characteristics in the set of training utterances without the candidate utterance;
determining a second multi-dimensional distribution of characteristics in the set of training utterances with the candidate utterance;
determining that the first multi-dimensional distribution is more divergent from the target multi-dimensional distribution than the second distribution; and
in response to determining that the first multi-dimensional distribution is more divergent from the target multi-dimensional distribution than the second distribution, determining that adding the particular candidate utterance to the set of training utterances reduces the divergence of the multi-dimensional distribution of the characteristics in the set of training utterances from the target multi-dimensional distribution.

14. The system of claim 8, the operations comprising:
training an automated speech recognizer using the set of training utterances including the particular candidate utterance.

15. A non-transitory computer-readable medium storing software comprising instructions executable by one or more computers which, upon such execution, cause the one or more computers to perform operations comprising:
obtaining a target multi-dimensional distribution of characteristics in an initial set of candidate utterances;

selecting a subset of the initial set of candidate utterances based on speech recognition confidence scores associated with the candidate utterances;

selecting a particular candidate utterance from the subset of the initial set of utterances;

determining that adding the particular candidate utterance to a set of training utterances reduces a divergence of a multi-dimensional distribution of the characteristics in the set of training utterances from the target multi-dimensional distribution; and adding the particular candidate utterance to the set of training utterances.

16. The medium of claim 15, wherein the characteristics comprise two or more of: sub-words included in utterances, gender of speaker, accent of speaker, age of speaker, application that the utterance originates, or confidence score.

17. The medium of claim 15, wherein obtaining a target multi-dimensional distribution of characteristics in an initial set of candidate utterances comprises:

obtaining the initial set of candidate utterances;

calculating a distribution of sub-words in the initial set of candidate utterances based on transcriptions associated with the initial set of candidate utterances;

calculating a distribution of another characteristic in the initial set of candidate utterances; and generating the target multi-dimensional distribution from the calculated distributions.

18. The medium of claim 15, wherein selecting a subset of the initial set of candidate utterances based on speech recognition confidence scores associated with the candidate utterances comprises:

filtering the initial set of candidate utterances based on the speech recognition confidence scores to obtain the subset of the initial set of candidate utterances.

19. The medium of claim 15, wherein determining that adding the particular candidate utterance to a set of training utterances reduces a divergence of a multi-dimensional distribution of the characteristics in the set of training utterances from the target multi-dimensional distribution comprises:

obtaining a set of utterances consisting of candidate utterances that were previously added from the initial set of candidate utterances.

20. The medium of claim 15, wherein determining that adding the particular candidate utterance to a set of training utterances reduces a divergence of a multi-dimensional distribution of the characteristics in the set of training utterances from the target multi-dimensional distribution comprises:

determining a first multi-dimensional distribution of characteristics in the set of training utterances without the candidate utterance;

determining a second multi-dimensional distribution of characteristics in the set of training utterances with the candidate utterance;

determining that the first multi-dimensional distribution is more divergent from the target multi-dimensional distribution than the second distribution; and in response to determining that the first multi-dimensional distribution is more divergent from the target multi-dimensional distribution than the second distribution, determining that adding the particular candidate utterance to the set of training utterances reduces the divergence of the multi-dimensional distribution of the characteristics in the set of training utterances from the target multi-dimensional distribution.

* * * * *